United States Patent
Pham (10) Patent No.: US 9,855,880 B1
(45) Date of Patent: Jan. 2, 2018

(54) RECREATION VEHICLES WITH SLIDE-OUT OVER THE WHEEL WELLS

(71) Applicant: Tuan Anh Pham, Huntington Beach, CA (US)

(72) Inventor: Tuan Anh Pham, Huntington Beach, CA (US)

(*) Notice: Subject to any disclaimer, the term of this patent is extended or adjusted under 35 U.S.C. 154(b) by 0 days.

(21) Appl. No.: 15/339,481

(22) Filed: Oct. 31, 2016

(51) Int. Cl.
*B60P 3/00* (2006.01)
*B60P 3/34* (2006.01)
*B60P 3/36* (2006.01)

(52) U.S. Cl.
CPC .............. *B60P 3/34* (2013.01); *B60P 3/36* (2013.01); *B60Y 2200/80* (2013.01)

(58) Field of Classification Search
CPC ..................................... B60P 3/34; B60P 3/36
USPC ......... 296/26.12, 26.13, 26.08, 26.14, 26.09, 296/26.1, 26.11, 165, 172, 176, 173, 171
See application file for complete search history.

(56) References Cited

U.S. PATENT DOCUMENTS

| 6,976,721 B2 * | 12/2005 | Rasmussen | B60P 3/34 296/165 |
| 7,258,389 B2 * | 8/2007 | Franzini | B60P 3/34 296/156 |

* cited by examiner

*Primary Examiner* — Joseph D Pape (57) ABSTRACT

The present invention relates to a vehicle having a fixed room and a slide-out room which extends and retracts relative to the fixed room. The slide-out room having a floor with multiple levels which wraps around the wheel well of the vehicle. The slide-out room is able to locate over the vehicle wheel wells with the slide-out floor lower than the top of the wheel well allowing for a much lower vehicle profile. The fixed room includes a floor section, a floor flap section which will drop down at the edge to flush with the slide-out floor at the edge forming a contiguous floor throughout the vehicle when the slide-out is fully extended, sidewall sections, a step-down entrance door well section, and a roof section. The slide-out room includes a floor section which has more than one level of flooring to cover the wheel wells and the step-down entrance door well section. Furthermore, when the slide-out room is retracted, the slide-out floor pushes the floor flap of the fixed room up and slides under the floor flap to tuck underneath the floor flap. The vehicle of the present invention may have other slide-out assemblies in the fixed room above the floor flap.

10 Claims, 7 Drawing Sheets

RECREATION VEHICLES WITH SLIDE-OUT OVER THE WHEEL WELLS

BACKGROUND OF THE INVENTION

Field of the Invention

The present invention relates to recreational vehicles (RV's), and more particularly, to motor homes and travel trailers that are adapted in size so as to increase the available living space of the vehicle.

Discussion of Prior Art

Figure 2:
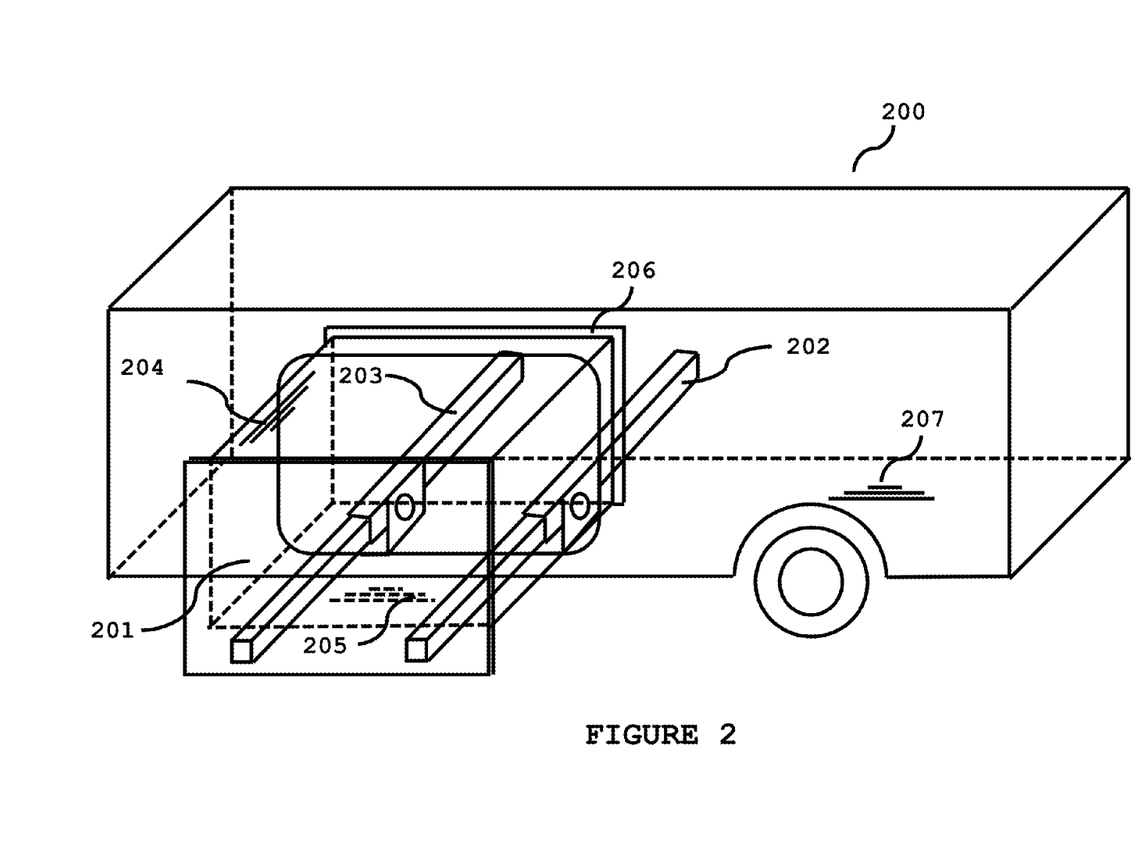
FIG. 2 is a perspective view of a prior art RV with a slide-out extended through the sidewall.

Present day recreational vehicles with slide-out rooms are very common. However, numerous prior arts describe slide-out rooms which requires a level floor to operate. Such slide-outs are either above the wheel wells of the vehicle which dictate a higher roof line or avoiding the wheel well area which dictate a longer vehicle body. For a very small recreational vehicle with a small body where the wheels are most likely to be at or near the center of the vehicle body, those slide-out rooms which require a level floor to operate are not workable. Moreover, in prior art, a typical slide-out room design of a vehicle 200 as shown in FIG. 2 consists of a box-like design slide-out room 201, a floor section 205 which is substantially the same area of the roof 204, a set of slide-out mechanism 202 and 203 to extend and retract the slide-out room, a stop wall 206. In prior art, when slide-out room 201 is extended or retracted, the slide-out room 201 relies on plurality of slideable members (not shown) to glide on the floor of the vehicle 200 necessitate a even floor space, thus, mostly avoiding the wheel well area. Furthermore, when slide-out room 201 is fully extended, the slide-out room 201 relies on the slide-out mechanism 202 and 203 together with stop wall 206 to provide structure support to hold slide-out room in place. Thusly, in the fully extended position, the floor of the slide-out room is above the floor of the main floor 207 of the vehicle. Numerous prior arts describing different methods and system to level slide-out floor 205 with the main floor 207 of the vehicle. Bryan E. Tillett's U.S. Pat. No. 5,706,612 disclosed a method of leveling the slide-out floor with the main trailer floor by sliding the slide-out past the main floor of the trailer down an inclined slope to level with the main trailer floor. Another approach is disclosed by U.S. Pat. No. 6,976,721 B2 to C. Martin Rasmussen. Rasmussen's patent disclosed a pivot system where the slide-out room is pivot downward so that the slide-out floor is substantially level with the main trailer floor. Another prior art disclosed by U.S. Pat. No. 5,577,351 to James E. Dewald, Jr. et al. In Dewald et al. patent, the slide-out room is extended past the main floor then lowered to the same level of the main floor. In general, the conventional design to achieve a flush floor between the slide-out room and the main RV floor is to extend the slide-out room past the main RV floor then lower or tilt the slide-out room to achieve a flush floor. The main disadvantages of these approaches are the complexity for the structure support and the power required to manipulate (i.e. tilt, lower) the slide-out room to achieve a flush floor while in the fully extended position.

Therefore, what is desired is a method and system that can provide a slide-out room with multiple flooring levels to accommodate the wheel wells and other floor levels such as step-down entrance door well yet does not require complex structure support to achieve a flush floor throughout the RV.

SUMMARY OF THE INVENTION

In one aspect of the present invention, a vehicle body structure is provided with a slide-out room over the wheel wells of the vehicle. In an exemplary embodiment, the vehicle includes a fixed room, a slide-out room, and a slide-out extension mechanism (not shown) capable of extending and retracting the slide-out room relative to the fixed room. Presently, the slide-out extension mechanism is a commercial product readily available for purchase from a number of Original Equipment Manufactures (EOM) such as Lippert Components Inc., Barker Manufacturing Co., etc. In one aspect of the present invention, the fixed room includes a floor section, a floor flap section overlapping with a portion of the slide-out floor, a plurality of sidewall sections with one large sidewall opening on the sidewall parallel to the side of the recreational vehicle to accommodate the slide-out room, and a roof section. The slide-out room includes a floor section which covers substantially the width of the fix room floor, a three sided sidewall section with the opening facing toward the inside of the fixed room forming a room extension to the fixed room, and a slide-out roof section. Furthermore, the slide-out extension mechanism extends and retracts the slide-out room in a cantilevered manner.

In another aspect of the invention, when the slide-out room is extended out, only about half of the slide-out floor is outside of the fixed room, the other half of the slide-out floor remains inside the fixed room to act as counterweight for the slide-out room. Furthermore, when the slide-out room is extended out, the floor flap of the fixed room will drop down at the edge adjacent to the slide-out room to occupy the floor area left vacated by the floor of the slide-out room. Moreover, at the edge of the slide-out floor adjacent to the fixed room floor flap, the slide-out floor edge is fitted with a sheet metal having an inclined edge so that when the slide-out room is fully extended, the floor level between the slide-out room floor and the fixed room will be substantially level. Correspondingly, the edge of the floor flap facing the inclined angle will be shaved with a matching angle with the sheet metal edge so that both edges will align closely together. When the slide-out room is retracted, the inclined edges will help to push the floor flap of the fixed room up and allow the slide-out floor to slide underneath the floor flap of the fixed room. Furthermore, to help with the slide-out floor sliding under the floor flap of fixed room, the floor flap is fitted with rollers at the edge facing the floor of the slide-out room. These rollers will assist the slide-out floor to slide under the floor flap more readily.

This brief summary, rather broadly, has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures.

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Figure 1:
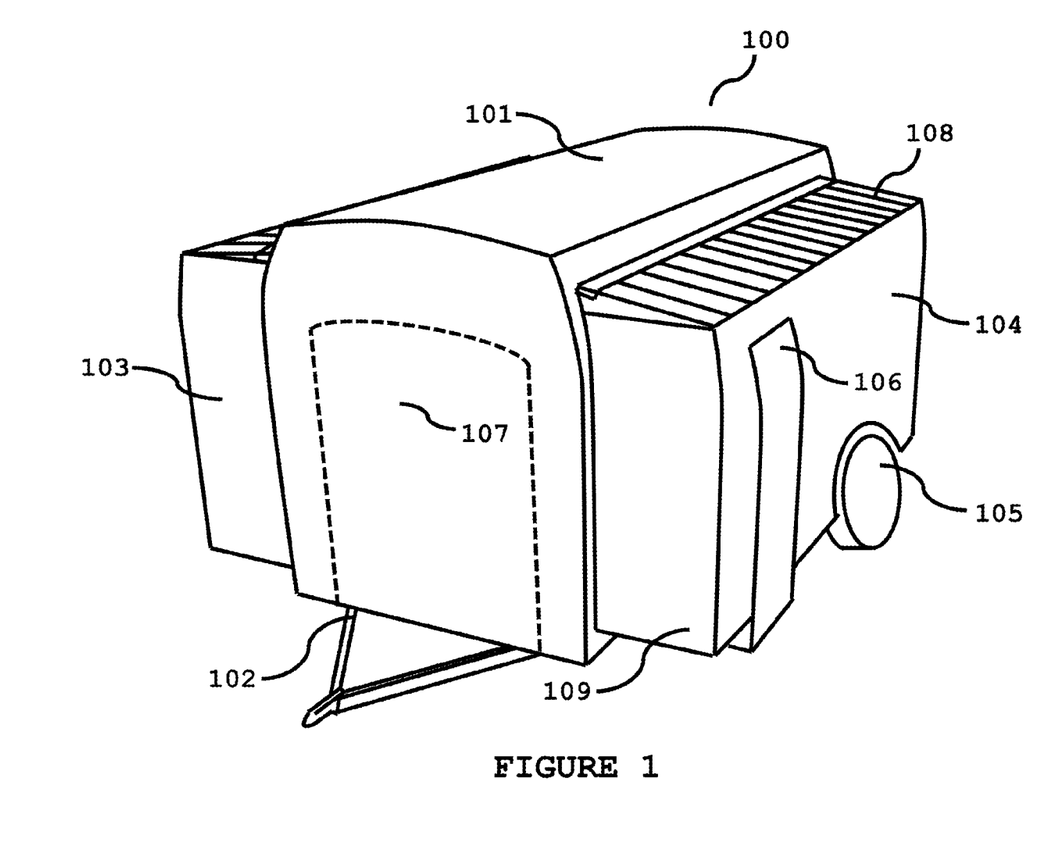
FIG. 1 is a perspective view of a RV body structure comprises of a rigid enclosed body shell forming a fixed room and a carriage assembly with wheels and floor structure support (not shown), and with two slide-out rooms in the extended positions.

FIG. 1 illustrates one embodiment of a RV's body structure 100 comprising of a rigid body shell forming a fixed room 101 and a carriage assembly 102 with two slide-out rooms 103 and 104 in the extended positions. The body structure 100 may be part of a motorized RV or a towable trailers. The carriage assembly 102 attached to a plurality of wheels 105 so as to permit rolling movement of the motorized RV or a towable trailer. FIG. 1 further illustrates a rigid body shell 101 that is mounted above carriage assembly 102 having the main roof, front and rear walls, with openings on the side walls to accommodate two slide-out rooms 103 and 104. Furthermore, the slide-out rooms 103 and 104 are coupled to the carriage assembly 102 by either electrically, or hydraulically, or electro-mechanically operated slide-out mechanism (not shown) in order to extend or retract the slide-out rooms 103 and 104 independently of each other's. In the preferred embodiment, the exterior wall of slide-out chambers 104 having at least one entry door 106. In another preferred embodiment, for motorized RV, the rigid body shell 101 having at least one cut out opening 107 to facilitate slide-out access directly from the front driving cab area. The slide-out room 103 and 104 may either be placed in the extended position independently so as to effectively increase the desired living space of RV body structure 100.

Figure 3:
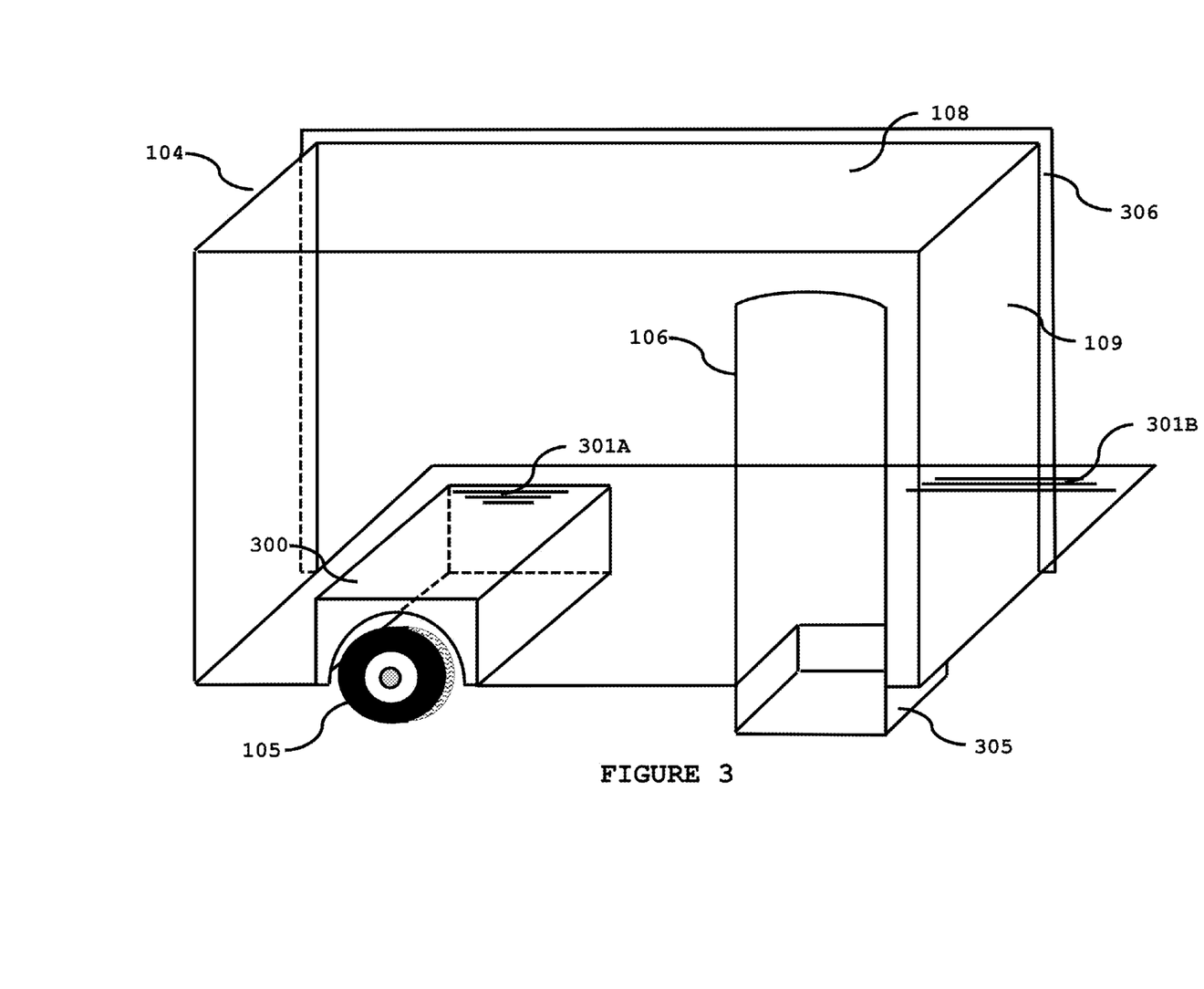
FIG. 3 is a perspective view of the slide-out room in accordance with present invention.

With reference to FIG. 3, not to be taken in a limiting sense, a detailed plan of the slide-out room 104 of FIG. 1. In FIG. 3, slide-out room 104 comprises of a floor section having a floor level 301A above the wheel well 300 and the main slide-out floor section 301B having the width substantially the same width of the rigid body shell 101 of FIG. 1. The slide-out room floor section 301B having a step-down entrance door well 305 and an entrance door well 106. Along the edges of the plurality of sidewalls 109 and roof 108 of the slide-out room opening facing the interior of the rigid body shell 101 of FIG. 1, the slide-out room 104 has a plurality of stop walls 306 lined with commercially available rubber seal forming a weather tight seal to the slide-out opening of rigid body shell 101. In one aspect of the present invention, slide-out room 104 is normally the street side slide-out room of the RV 100. The substantial size of the floor 301B provides structure support for the floor area 301A over the wheel well when the slide-out room 104 is fully extended outside the body of the rigid body shell 101 of FIG. 1.

Figure 4A:
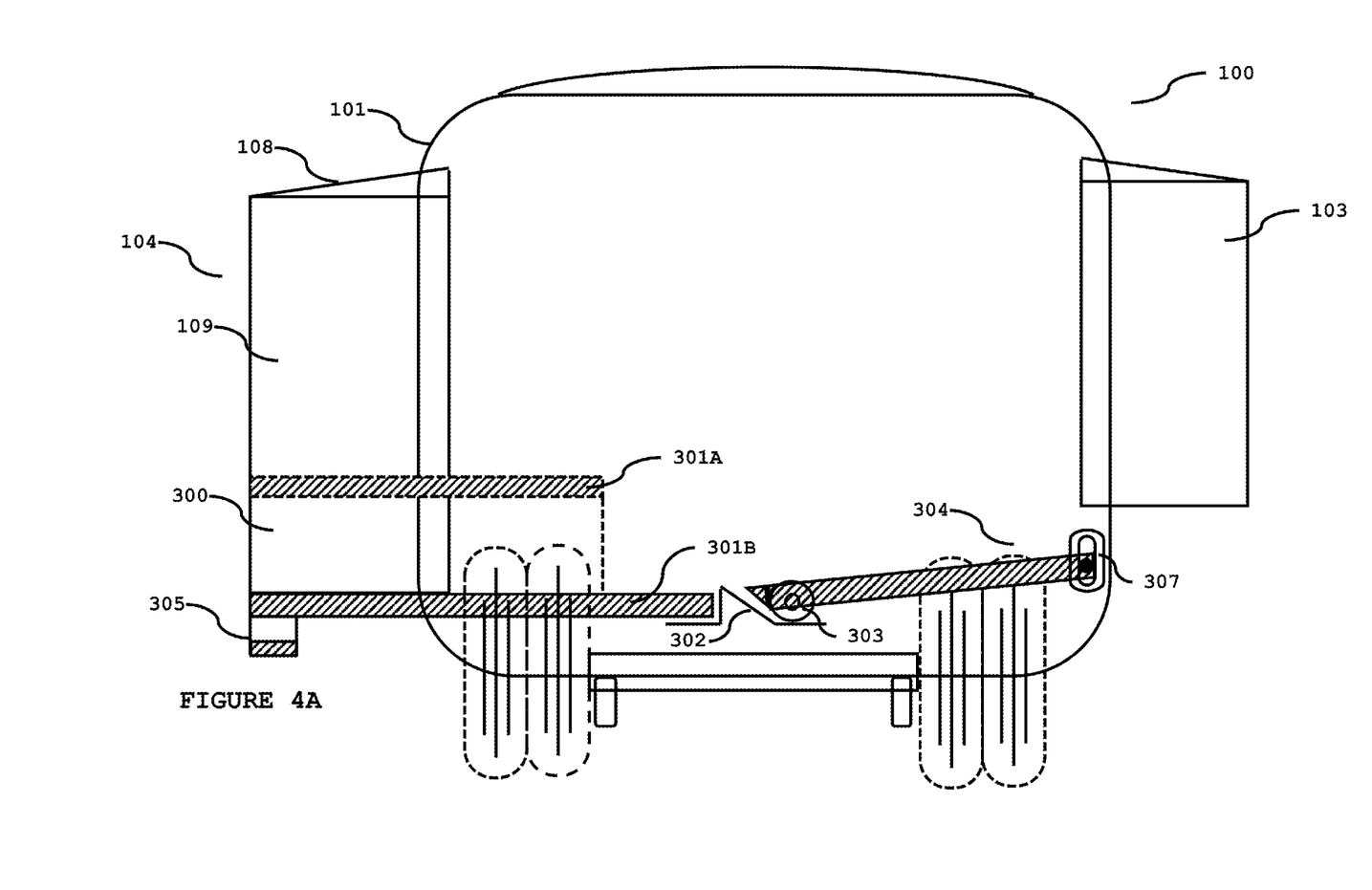
FIG. 4A is a cross sectional view of a RV body structure of FIG. 1 comprises of a fixed room in a body shell and a carriage assembly with wheels and floor structure support, and with two slide-out rooms in the extended positions; having the fixed room floor flap dropped down at one edge to the same level with the floor of the slide-out forming a contiguous level floor.

Reference will now be made with FIGS. 4A and 4B which provide the detailed cross sectional view of a RV's body assembly 100 of FIG. 1. With reference to FIG. 4A, not to be taken in a limiting sense, a detailed plan for the RV body structure of FIG. 1. In one aspect of the present invention, the slide-out main floor having multiple levels 301A and 301B in order to cover the substantial floor area of the RV body width and also provide floor covering for the wheel well 300 and the step-down entrance door well 305. In FIG. 4A, the main slide-out floor 301B is fitted with a sheet metal edge 302 forming an inclined angle at the edge. It will be appreciated that the sheet metal having an inclined edge illustrated herein is simply illustrative of one of a number of possible inclined edges that can be made with sheet metal or other suitable materials without departing from the spirit of the present invention. Moreover, the rigid body shell 101 of FIG. 1 has a floor flap 304 which cover substantially the area left vacated by the slide-room 104 when it is in the fully extended mode. The floor flap 304 is attached to the side wall of the fix room 101 with a plurality of slotted brackets 307 permitting limited vertical movement of the floor flap 304 to form a flush floor with the floor 301B of the slide-out 104 and to permit the floor 301B to slide under the floor flap 304. It will be appreciated that the design of the slotted brackets 307 illustrated herein is simply illustrative of one of a number of possible designs that can be made without departing from the spirit of the present invention. When the slide-out 104 is fully extended, the inclined metal edge 302 together with the slots in the slotted brackets 307 allow the fixed room floor flap 304 to drop down to the same level of the floor 301B of the slide-out forming a contiguous and level floor. To reduce the friction between the slide-out floor 301B and the fixed room floor flap 304, the fixed room floor flap 304 is fitted with plurality of rollers 303 to facilitate ease of movement of the slide-out floor 301B while under the load of the fixed room floor flap weight 304. It will be appreciated that the placement of the rollers on the fixed room floor flap illustrated herein is simply illustrative of one of a number of possible placement locations that can be made without departing from the spirit of the present invention. In the extended mode, slide-out room 104 will only extend telescopically as much as the slide-out sidewalls 109 and the roof 108 can still provide cover. It can be appreciated that since the flush floor is achieved only by the gravity force acting on the floor flap 304, the present invention has eliminated the need to manipulate (i.e. tilting, lowering) the slide-out room 104 in order to obtain a substantially flush floor throughout the RV. Furthermore, the substantial size of the floor 301B provides the structure rigidity to fully cover the wheel well 300 both in the fully extended and retracted modes, thus, making the present invention suitable even for a very small RV body size.

Figure 4B:
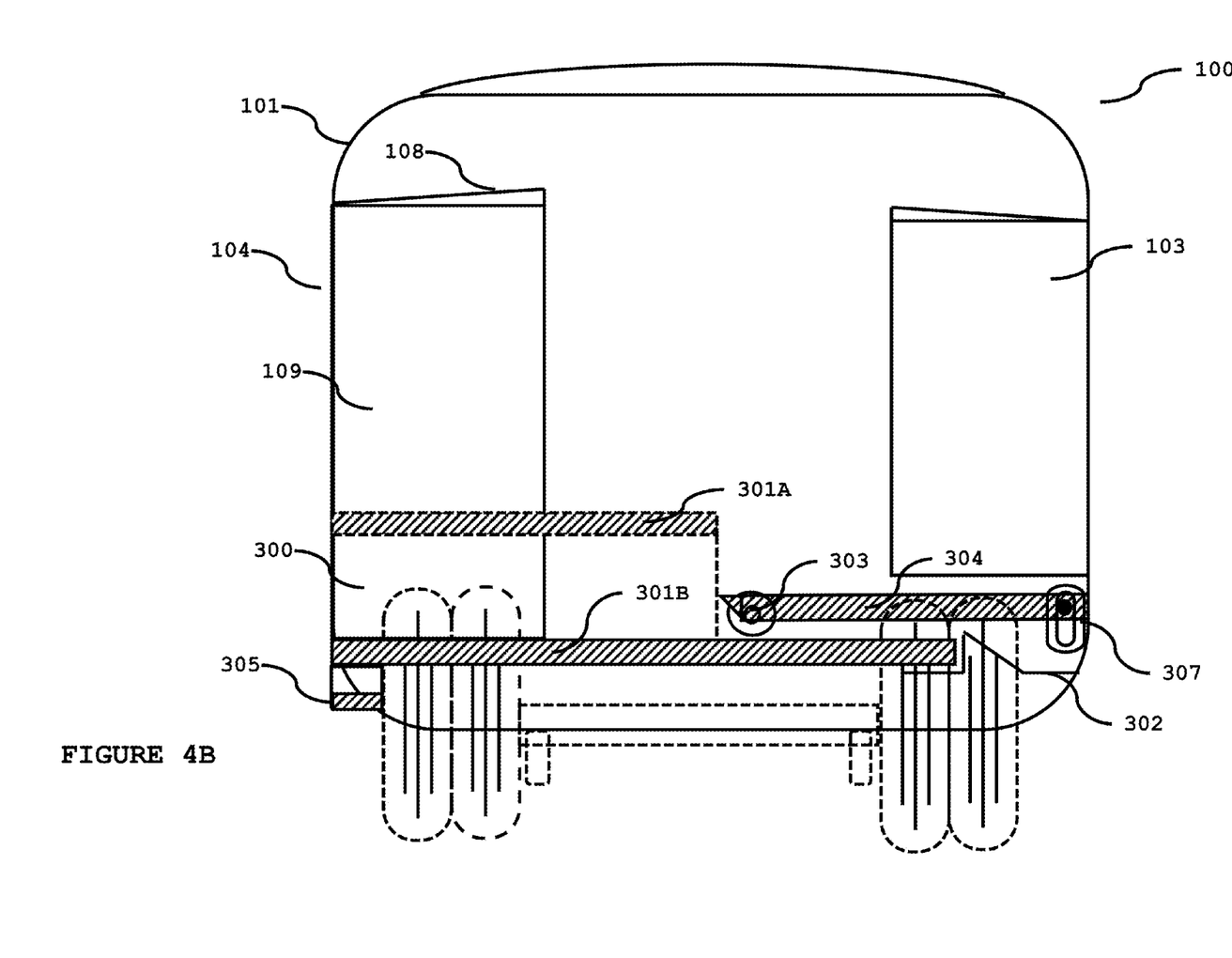
FIG. 4B is the cross sectional view of the RV body assembly of FIG. 1 with the two slide-out rooms in the fully retracted positions; having the slide-out floor tucked under the floor flap of the fixed room.

We now refer to FIG. 4B depicting the two slide-out rooms 103 and 104 of FIG. 1. FIG. 4B depicts the cross sectional view of the slide-out chambers 103 and 104 of FIG. 1 in a fully retracted mode. In FIG. 4B, when the slide-out room 104 is retracted, the slide-out floor 301B and its inclined edge 302 push the fixed room floor flap 304 up and slide under the fixed room floor flap 304 allowing the slide-out floor 301B to tuck underneath the fixed room floor flap 304.

Reference will now be made with FIGS. 5A and 5B which provide the detailed perspective view of a RV's body assembly 100 of FIG. 1.

Figure 5A:
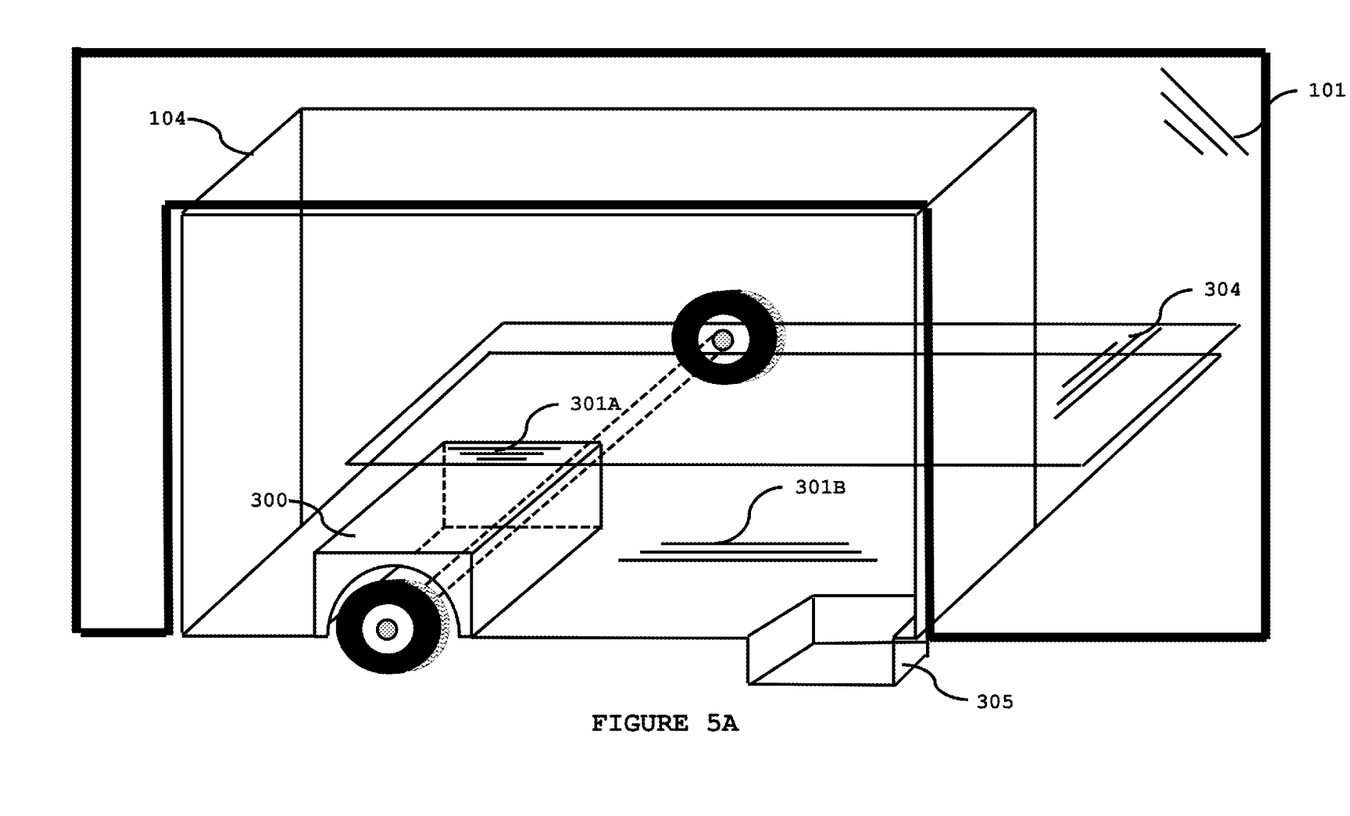
FIG. 5A is an enlarged perspective view of an embodiment of the slide-out opening of the fixed room of the RV body assembly of FIG. 1; having a slide-out room in the fully retracted mode; having slide-out floor with multiple floor levels covering wheel well and the step-down entrance door well; having the slide-out floor tucked under the floor flap of the fixed room according to an embodiment of the present invention.

We now refer to FIG. 5A. FIG. 5A illustrates one aspect of the present invention for a method of achieving a flat floor throughout the RV when the slide-out room 104 is fully extended. In FIG. 5A, the floor area 301A over the wheel well 300 is large enough to allow the slide-out floor 301A to cover the wheels both in fully retracted mode and fully extended mode. Above the wheel well 300, creative placement of RV cabinets (not shown for clarity purposes) will hide the body of wheel well 300 from view. The length of wheel well 300 will only occupy the substantial portion of slide-out room floor 301B where the sidewalls and the roof of the slide-out room will provide cover. The remainder of slide-room floor 301B is overlapping with the fixed room floor flap 304 and will be used in conjunction with fixed room floor flap 304 to form a flat floor throughout the RV when the slide-out room 104 is fully extended. FIG. 5A illustrates one aspect of the present invention where the placement of the wheel well and the step-down entrance door well will occupy only the portion of the slide-out room floor 301B where there will be sidewalls and roof to cover. The remaining slide-out room floor 301B will remain inside the fixed room 101 and will be tucked under the fixed room floor flap 304 when the slide-out room 104 is in fully retracted mode.

Figure 5B:
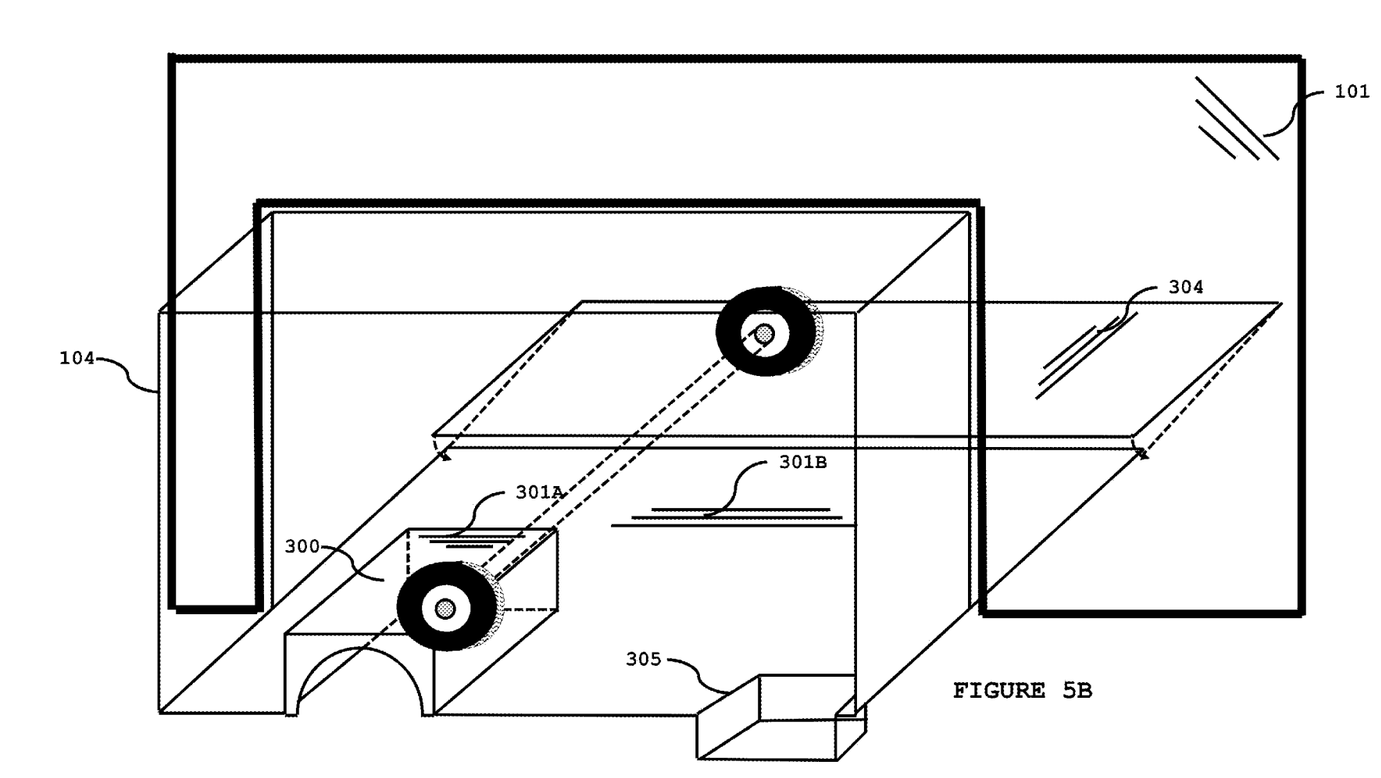
FIG. 5B is an enlarged perspective view of an embodiment of the slide-out opening of the fixed room of the RV body assembly of FIG. 1; having a slide-out room in the fully extended mode; having the floor flap of the fixed room dropped down to level with the floor of the slide-out to form a contiguous level floor throughout the RV according to an embodiment of the present invention.

We now refer to FIG. 5B. FIG. 5B depicts slide-out room 104 in the fully extended mode with slide-out room floor 301B slid out from under the fixed room floor flap 304 and the edge of fixed room floor flap 304 adjacent to the edge of the slide-out room floor 301B will drop down to form a substantially flat floor throughout the RV.

Although the present invention has been described with reference to specific embodiments, these embodiments are illustrative only and not limiting. Many other applications and embodiments of the present invention will be apparent in light of this disclosure and the following claims.

The invention claimed is:

1. An expansible body structure for recreation vehicles, comprising:
    a carriage assembly having a plurality of wheels,
    a rigid body shell enclosure having a means for mounting onto the carriage assembly comprising a roof section, a plurality of sidewall sections defining a main living space having a front sidewall section facing the direction of travel, a rear sidewall facing opposite direction to the front sidewall, and a plurality of side-body sidewalls, a floor section having cut out areas in the areas where the floor overlaps with the wheels of the carriage assembly allowing the floor section of the rigid body shell to have a placement on the carriage assembly at a height substantially lower than the diameter of the wheels, the sidewall sections of the rigid body shell having at least one substantially large opening,
    an extendable slide-out assembly having a means for mounting inside the rigid body shell enclosure at the at least one opening comprising a floor section having multiple levels, a plurality of sidewalls, and a roof forming a room extension with one side opening toward the main living space of the rigid body shell,
    the plurality of sidewalls including a sidewall facing the outside of the vehicle having an opening for egress,
    the slide-out assembly having a means to extend the slide-out assembly through the at least one opening of the rigid body shell from a retracted position to an extended position to provide a larger living area in the main living space,
    the slide-out assembly having a means to retract the slide-out assembly from an extended position to a retracted position having the outside facing sidewall of the slide-out assembly flush with one of the plurality of side-body sidewalls of the rigid body shell enclosure,
    the floor section of the slide-out assembly comprising a main floor area occupying a substantial portion of the rigid body shell floor, an elevated floor area above the wheels of the carriage assembly, and a sunken floor area at the egress opening,
    the elevated floor area section having a plurality of sidewall sections forming a wheel well box having an opening facing the wheels of the carriage assembly, the volume of the wheel well box is substantially large and the elevated floor area of the wheel well box having a height substantially above the top of the wheels for the wheel well box to clear the wheels of the vehicle during the extend and retract operations of the slide-out assembly,
    the sunken slide-out floor area at the egress opening comprising a sunken floor area and a plurality of sidewalls forming a step-down entrance door well having an opening facing the outside of the slide-out assembly, the width of the entrance door well opening facing the outside of the slide-out assembly having substantially the same width as the egress opening forming an egress opening extension for a taller egress opening,
    the slide-out assembly having stop walls along the edges of the plurality of sidewalls and the roof adjacent to the opening of the rigid enclosure body shell to form a weather tight seal between the slide-out assembly and the rigid enclosure body shell,
    the rigid enclosure body shell having a means for mounting a floor flap longitudinally on the sidewall of the rigid enclosure body shell opposite to the slide-out opening and at the substantially same level with the slide-out floor, the rigid enclosure body shell having a plurality of slotted brackets to mount the floor flap onto the sidewall of the rigid enclosure body shell,
    the slotted brackets having a means to permit the floor flap a limited vertical travel distance of about the thickness of the slide-out floor,
    the carriage assembly having a slide-out mechanism for selective extending and retracting the slide-out assembly, the expansible body structure for recreational vehicles can be a towable trailer, or part of a motorized recreational vehicle having a driving cab area abutting to the front sidewall of the rigid body shell, for the vehicle operator to operate the vehicle.

2. A recreational vehicle according to claim 1, wherein the rigid enclosure body shell having the floor flap overlapping with the floor area of the slide-out assembly unoccupied by the wheel well area and the step-down entrance door well; having one side of the floor flap affixed to the wall of the rigid enclosure body shell; the floor flap area having a means to substantially cover the floor area left vacated by the slide-out floor when fully extended.

3. A recreational vehicle according to claim 1, wherein the edge of the slide-out floor adjacent to the edge of the floor flap of the rigid enclosure body shell having an inclined edge to facilitate ease of movement for the floor of the slide-out assembly to slide under the floor flap when the slide-out assembly is retracted.

4. A recreational vehicle according to claim 1, wherein the floor flap of the rigid enclosure body shell being fitted with rollers to facilitate ease of movement for the floor flap to slide over the floor of the slide-out assembly.

5. A recreational vehicle according to claim 1, having a means for the floor of the slide-out assembly to slide and tuck under the floor flap of the rigid enclosure body shell when the slide-out assembly is retracted.

6. A recreational vehicle according to claim 1, having a means for the floor flap of the rigid enclosure body shell to drop down and be supported at the adjacent edge of the floor of the slide-out assembly and at the plurality of slotted brackets to form a contiguous level floor throughout the body of the recreational vehicle.

7. A recreational vehicle according to claim 1, wherein the rigid enclosure body shell includes a front sidewall cut-out to provide access to a driving cab area.

8. A recreational vehicle according to claim 1, wherein the rigid enclosure body shell having a plurality of slide-out assemblies in the area above the floor flap of the rigid enclosure body shell.

9. A recreational vehicle according to claim 1, having a means for expanding the living space by extending the slide-out assembly only the width of the floor of the slide-out assembly which has sidewalls and roof cover outside of the rigid enclosure body shell and stowing the slide-out assembly for travelling by retracting the slide-out assembly flush with the body of the rigid enclosure body shell.

10. A recreational vehicle according to claim 1, having a means for extending only the width of the floor of the slide-out assembly which has sidewalls and roof cover, using the weight of the remaining half of the slide-out floor and held in place by the stop walls of the slide-out, to act as counter-weight to the extended half of the slide-out assembly.

\* \* \* \* \*